Oct. 12, 1926. 1,602,842
G. G. BROCKWAY
FULLER'S EARTH DRIER
Filed March 19, 1925 5 Sheets-Sheet 1

WITNESSES
Charles N. Ourand
E. N. Lovewell

INVENTOR
G. G. Brockway
BY
ATTORNEY

Oct. 12, 1926. 1,602,842
G. G. BROCKWAY
FULLER'S EARTH DRIER
Filed March 19, 1925 5 Sheets-Sheet 4

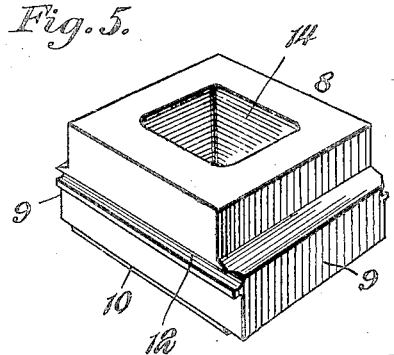
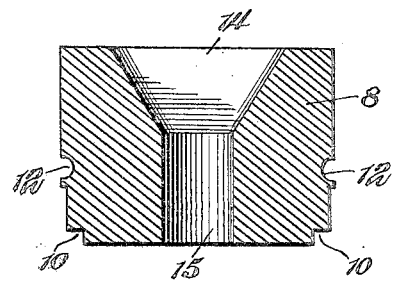
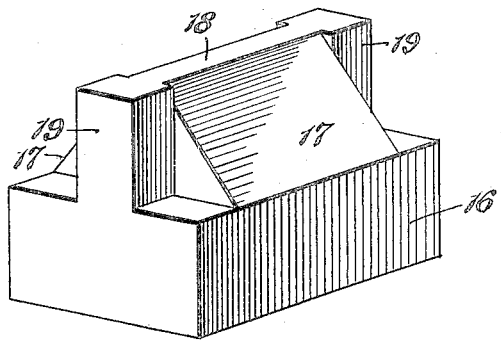
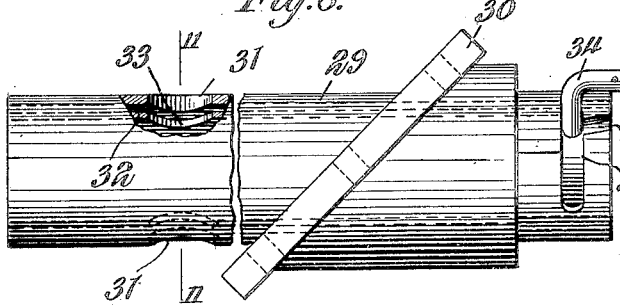
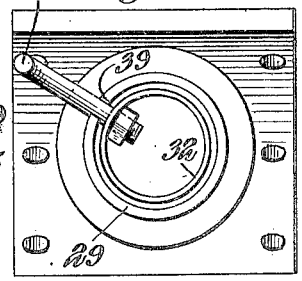
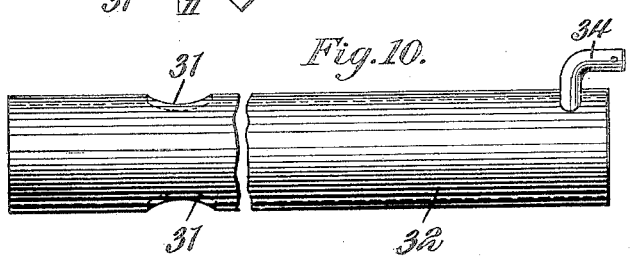
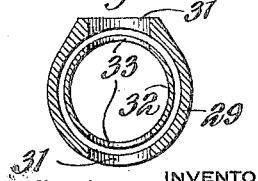

Patented Oct. 12, 1926.

1,602,842

UNITED STATES PATENT OFFICE.

GEORGE GLEN BROCKWAY, WARREN, PENNSYLVANIA.

FULLER'S-EARTH DRIER.

Application filed March 19, 1925. Serial No. 16,707.

This invention relates to a furnace or retort, particularly adapted for drying or reclaiming fuller's earth, bone black, or other filtering material used in filtering oil and other commercial products.

One of the important objects of the invention is to provide improved means for feeding the material into the retort, and for regulating its progress through the same, so that it will be all subjected to the same uniform temperature for a sufficient length of time to completely remove the foreign matter therefrom without overheating the same, and without any other deleterious results.

The drier, which constitutes my invention, may be constructed with any number of shafts or flues, depending upon the capacity desired. All of these are built up from standard parts, which are shipped separate, and erected according to previously prepared plans. Each shaft or flue has an individual feed control, and is provided with projections, alternating on opposite sides, for the purpose of guiding the material being dried in a zig-zag or tortuous course down the shaft from its entrance to its discharge. The vertical surfaces of the shafts are formed by fire brick and each projection is formed by a single block of the best refractory material which interlocks with the brick. The blocks are so designed as to insure the greatest strength and durability, and will not burn out or become damaged like ordinary fire brick.

The detailed construction of the invention and the advantages thereof will be more specifically described in connection with the accompanying drawings, which illustrate one embodiment thereof.

In the drawings:

Figure 5 is a perspective view of one of the blocks used at the bottom of the shaft.

Figure 6 is a vertical transverse section of the block shown in Figure 5.

Figure 7 is a perspective view of one of the blocks used for forming a projection in the shaft.

Figure 8 is a side view of the feed controlling device.

Figure 9 is an end elevation of the parts shown in Figure 8.

Figure 10 is a side view of the valve for controlling the feed.

Figure 11 is a section taken on the line 11—11 of Figure 8.

Figure 1:
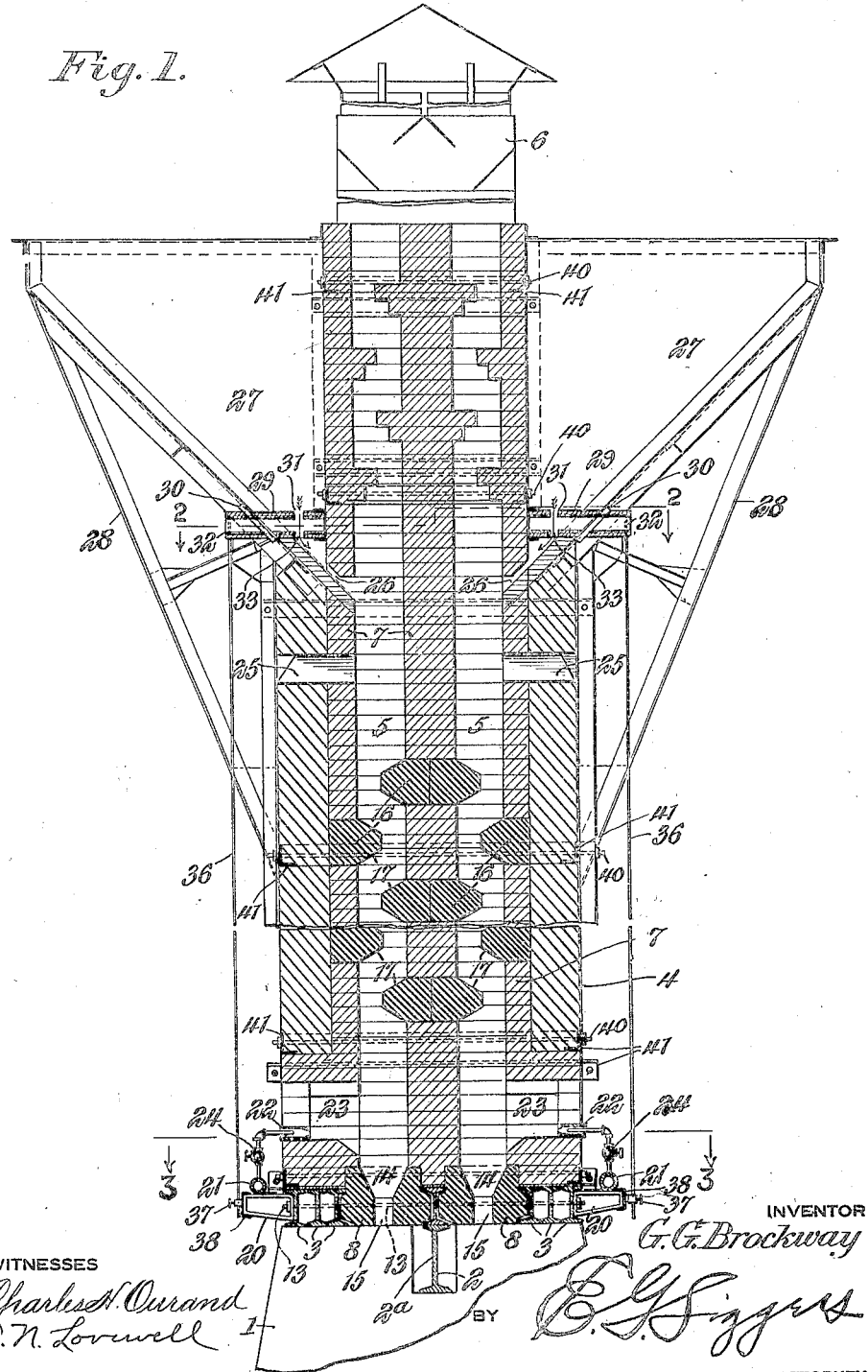
Figure 1 is a vertical transverse section through the invention.
Figure 2:
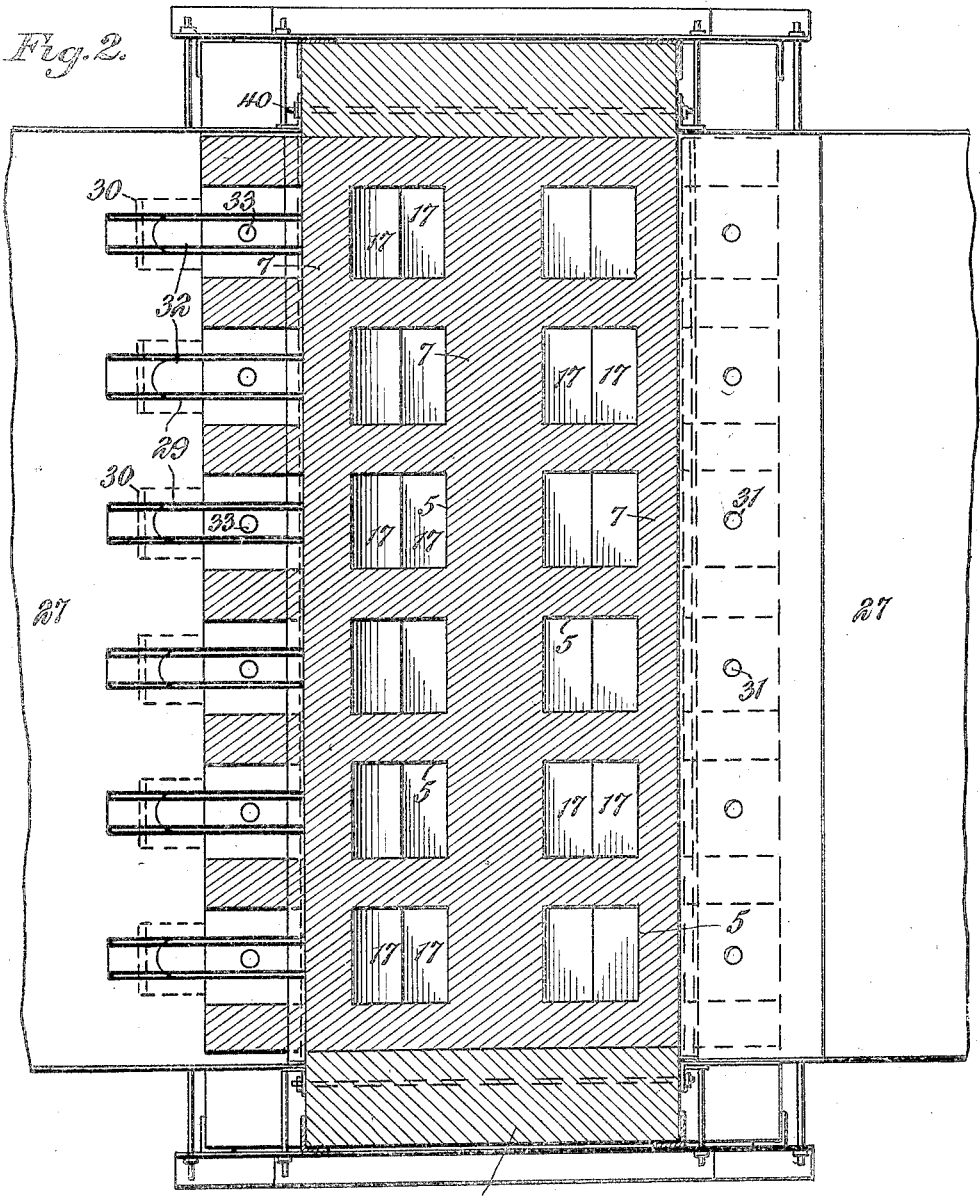
Figure 2 is a horizontal section taken on the line 2—2 of Figure 1.
Figure 3:
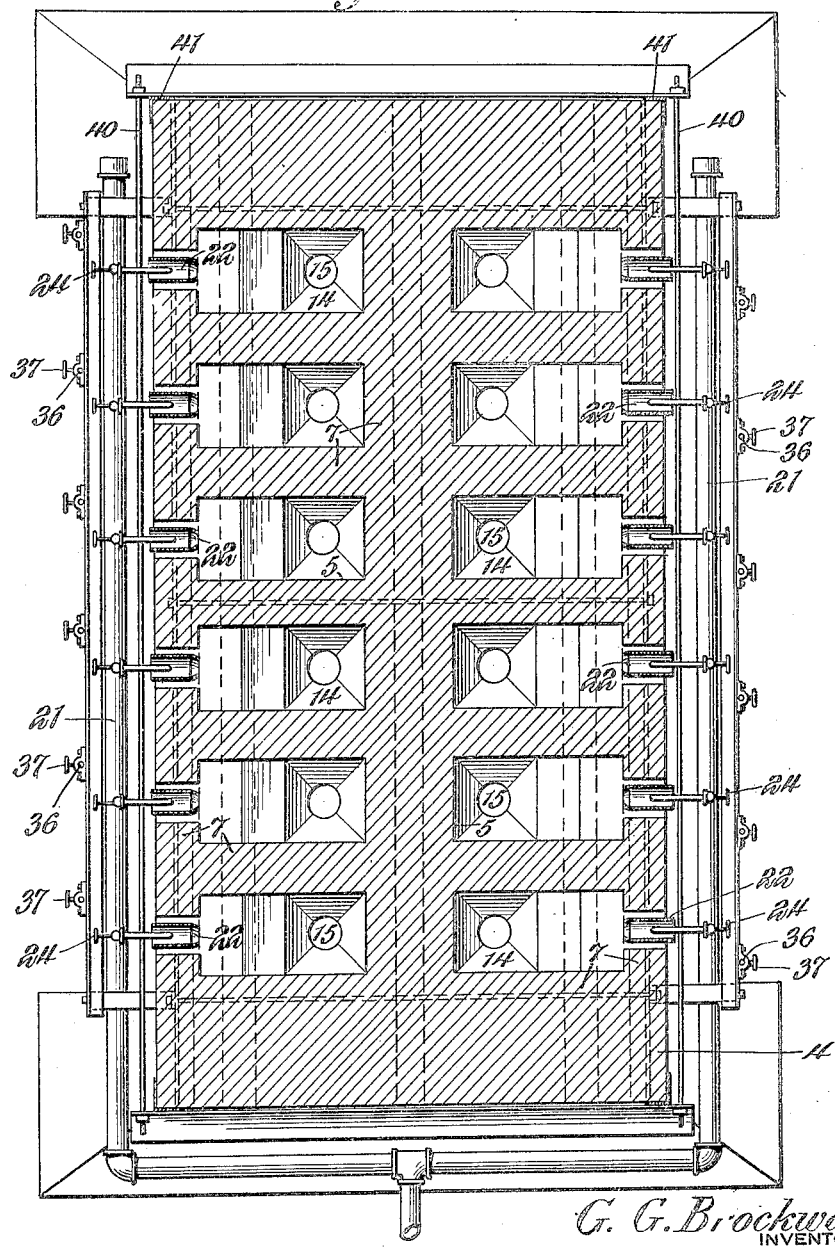
Figure 3 is a horizontal section taken on the line 3—3 of Figure 1.
Figure 4:
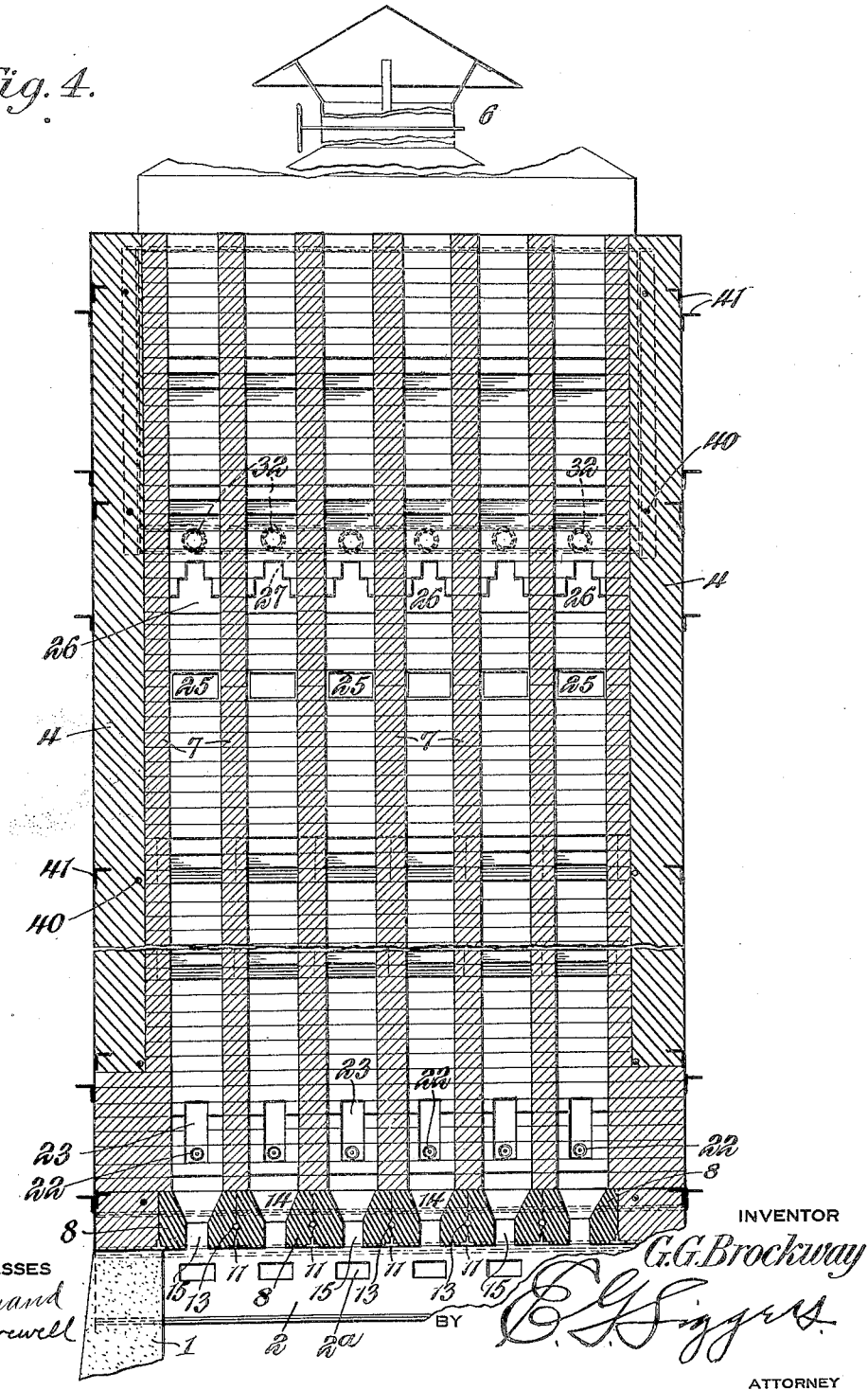
Figure 4 is a vertical section taken at right angles to the plane of Figure 1.

The structure to which my invention relates is supported on a base 1, preferably of concrete, and including two end piers, which support a large I beam 2. A series of smaller I beams 3 also rest on the base 1, and above the beams 2 and 3 there is built a masonry structure 4, forming a series of vertical shafts 5 of which there may be any desired number, and which are surmounted by a dust collector 6. The lining of the shafts, and all parts which come in direct contact with the heat, with the exception of blocks 16 hereinafter described, are formed of fire brick, indicated at 7 in Figures 1 and 4.

At the base of each shaft 5 is a block 8 of special construction, and shown in detail in Figures 5 and 6. Each block 8 may be in a single piece or it may be split parallel to the I beams 3 to avoid cracking when in service. It is formed on opposite faces with enlarged portions 9 which extend into the channels adjacent the webs of the opposed I beams 3, and are supported thereby. The ends of the blocks are formed with rabbets 10 along their lower edges for receiving small transverse I beams 11, which extend between and are supported by the I beams 3. The ends of the blocks 8 are also formed with grooves 12 for receiving long bolts or tie rods 13, which connect the several I beams 3. Each of the blocks 8 forms an outlet for the bottom of a shaft 5, said outlet being formed with a tapered mouth 14, which merges into a restricted discharge opening 15. Holes 2ª are provided in the I beam 2 so that an operator on one side may observe the earth streams which are discharged from the opposite side.

The projections which are arranged alternately on opposite sides of each shaft, in order to make a ziz-zag or tortuous course for the material as it descends, are formed by blocks 16, which are shaped as shown in Figure 7, each projection being formed by a single block. Each block 16 has two oppositely disposed inclined faces 17, which are of sufficient length to extend completely across one side of the shaft, and are separated by a sufficient distance so that the inner end 18 of the projection is of substantial thickness and not liable to chip. The end portions of the block extend into the lining of the shaft and are formed with rectangular extensions 19, so that they may be securely tied into the adjoining brick work.

Brackets 20 are secured by the bolts or tie rods 13, and support a gas or oil supply pipe 21, which has branches leading to the respective burners 22, one burner being provided at the base of each shaft, which is provided with a fire chamber 23. Each burner is individually controlled by a valve 24.

Each shaft 5 is provided with a clean-out box 25, above which is an inclined opening 26 through which the material is fed from a hopper 27 supported near the top of the masonry structure, and braced by suitable angle bars 28.

At the bottom of each hopper 27 is a sleeve 29 which extends horizontally through the inclined wall of the hopper, and is secured thereto by means of an inclined collar 30. The sleeve 29 is provided with discharge openings 31 which are in vertical registration, and rotatable within the sleeve 29 is a valve 32 having similar openings 33. The valve 32 is rotatable within the sleeve to regulate the rate of discharge by means of an arm 34, which is movable in a circumferential slot 35 formed on the sleeve. Connected to the arm 34 is a control rod 36, which extends downwardly to a control device 37 on a control board 38, mounted on the outer ends of the brackets 20. One end of the sleeve 29 is provided with a slot 39 connected with the circumferential slot 35, so that the valve may be removed when desired.

The masonry 4 is of substantial construction, and suitably bonded together by tie rods 40 and angle bars 41.

The blocks 16, which form the projections in the shafts 5, are also of heavy and rugged construction to withstand shipment and service. They are reversible and interchangeable, that is, the same blocks may be used in building different types of driers having any number of shafts desired. They are made from the best refractory material, and designed so that they fit against each other end to end for the desired number of shafts, and are securely tied into the brick work on all sides, except the inclined faces 17 which deflect the material in its downward progress. They will last indefinitely. The inclined surfaces 17 are at the proper angle, so that they will deflect the streams of material descending from above, and will retard it sufficiently for it to become heated to the proper temperature, and for a sufficient length of time to remove all foreign matter therefrom. By the use of these blocks, the cutting effect of the fire on the brick work and joints is limited entirely to the straight wall construction.

The blocks 8 at the bottoms of the shafts serve to gather the streams of material from the shafts 5, and to direct the same to a comparatively small outlet. The size and shape of the blocks 8 are such that each one fits in between the I beams 3 and 11, and between the rods 13, one block forming the complete base for the entire shaft, thus greatly reducing the labor of construction and the number of joints.

An individually controlled valve 32 is provided for each shaft, and the flow of material therethrough may be absolutely controlled so as to thoroughly clean the same without heating it excessively. The result is that all of the material emerging from the drier has been dried or roasted at the proper temperature determined in the laboratory, and checked by pyrometers with thermo-couples at each outlet, if such are desired, or the temperature may be checked or regulated, in the case of fuller's earth, by the color of the stream. If one feeder becomes clogged, it may be cleaned out without destroying the operation of the other shafts, either by rocking it back and forth, or by means of a wire, or by removing the valve entirely and dumping the contents, then replacing it, all of which requires only a few moments of time. The valves are regulated from the floor by the regulating devices 37, which are located in close proximity to the fire-controlling valve 24.

While I have shown and described the invention in the form which, at the present time, seems preferable, it is apparent that various modifications may be made therein within the scope of what is claimed without departing from the spirit of the invention.

What is claimed is:

1. A furnace of the character described, comprising a structure of masonry forming a number of shafts, each shaft having projections extending alternately from opposite faces thereof, each of said projections being formed from a single block of refractory material which extends beyond the sides of the projection into the masonry, and is there provided with rectangular lateral extensions, so that the block is securely tied in said masonry.

2. A furnace of the character described, comprising a structure of masonry forming a number of shafts, each shaft having projections extending alternately from opposite faces thereof, each projection continuing from side to side of the shaft and substantially half-way across the same and formed from a single block of refractory material, a burner for each shaft, and regulated means for feeding material into the shafts, each of said blocks having ends which extend beyond the sides of said projection into the masonry at the sides of the shaft and are there provided with rectangular lateral projections, so that the block is securely tied in said masonry.

3. A furnace of the character described, comprising a structure of masonry forming a number of shafts, each shaft having projections extending alternately from opposite faces thereof, each projection extending from side to side of the shaft and substantially half-way across the same, each projection being formed from a single block of refractory material, said block having a rectangular portion integrally connected to the base of the projection and set in said masonry, said rectangular portion extending beyond the sides of the shaft, and there having lateral rectangular extensions integral with the sides of the projection, whereby the block is securely tied in the masonry.

4. A furnace of the character described, comprising a structure of masonry forming a number of shafts, each having projections extending alternately from opposite faces thereof, each projection continuing from side to side of the shaft and substantially half-way across the same and formed from a single block of refractory material supported in said masonry, the part of said block forming the projection having upper and lower inclined faces which converge inwardly terminating in a vertical face of substantial thickness.

5. A furnace of the character described, comprising a structure of masonry forming a number of shafts, each having projections extending alternately from opposite faces thereof, each projection continuing from side to side of the shaft and substantially half-way across the same and formed from a single block of refractory material which extends laterally beyond the projections into the masonry, and is provided with angular extensions so that it is securely tied in said masonry, the part of said block forming the projection having upper and lower inclined faces which converge inwardly terminating in a vertical face of substantial thickness.

6. A furnace of the character described, comprising a structure of masonry forming a number of shafts, longitudinal and transverse flanged beams above which said masonry is supported, each of said shafts having at its lower end an outlet with convergent sides formed by a single or double block of refractory material with oppositely disposed projections fitting between the flanges of said beams.

7. A furnace of the character described, comprising a structure of masonry forming a number of shafts, each having projections extending from opposite faces thereof, each extension extending from side to side of the shaft and substantially half-way across the same, longitudinal and transverse I-beams above which said masonry is supported, each of said shafts having at its lower end an outlet with convergent sides formed by a single or double block of refractory material with oppositely disposed shoulders resting upon the lower flanges of said I-beams.

8. A furnace of the character described, comprising a structure of masonry forming a number of shafts, each having projections extending alternately from opposite faces thereof, each projection continuing from side to side of the shaft and substantially half-way across the same and formed from a single block of refractory material, a burner for each shaft, a hopper having a feed passage leading from its bottom through the masonry into each shaft near the top thereof, a sleeve in the bottom of the hopper having superposed openings leading to said feed passage, and an individually controlled rotary valve in each sleeve for controlling the discharge of material through said openings into the shaft.

In testimony, that I claim the foregoing as my own, I have hereto affixed my signature.

GEORGE GLEN BROCKWAY.